(12) United States Patent
Tokuda et al.

(10) Patent No.: US 11,655,118 B2
(45) Date of Patent: May 23, 2023

(54) FILM ROLL AND FILM BUNDLE

(71) Applicant: TOYOBO CO., LTD., Osaka (JP)

(72) Inventors: Kaya Tokuda, Otsu (JP); Masahiro Yamashita, Otsu (JP); Tetsuo Okuyama, Otsu (JP); Toshiyuki Tsuchiya, Otsu (JP); Naoki Watanabe, Otsu (JP); Shunsuke Ichimura, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 596 days.

(21) Appl. No.: 16/631,957

(22) PCT Filed: Jul. 13, 2018

(86) PCT No.: PCT/JP2018/026478
§ 371 (c)(1),
(2) Date: Jan. 17, 2020

(87) PCT Pub. No.: WO2019/017287
PCT Pub. Date: Jan. 24, 2019

(65) Prior Publication Data
US 2020/0180888 A1    Jun. 11, 2020

(30) Foreign Application Priority Data

Jul. 20, 2017 (JP) .............................. JP2017-140914

(51) Int. Cl.
*B65H 18/28* (2006.01)
*C09J 7/40* (2018.01)
*B32B 7/06* (2019.01)

(52) U.S. Cl.
CPC .............. *B65H 18/28* (2013.01); *C09J 7/403* (2018.01); *B32B 7/06* (2013.01);
(Continued)

(58) Field of Classification Search
CPC .......... B65H 18/28; B65H 2701/18483; B65H 39/16; B65H 19/1821; B65H 2701/172;
(Continued)

(56) References Cited

U.S. PATENT DOCUMENTS

| 2010/0189937 A1 | 7/2010 | Ogawa et al. |
| 2015/0368518 A1 | 12/2015 | Kawai et al. |
| 2018/0022881 A1* | 1/2018 | Seki ..................... G02B 6/0061 257/211 |

FOREIGN PATENT DOCUMENTS

| CN | 105273649 A | 1/2016 |
| JP | 2006-104344 A | 4/2006 |

(Continued)

OTHER PUBLICATIONS

China National Intellectual Property Administration, The Third Office Action in Chinese Patent Application No. 201880047955.9 (dated Sep. 24, 2021).

(Continued)

*Primary Examiner* — Patricia L. Nordmeyer
(74) *Attorney, Agent, or Firm* — Leydig, Voit & Mayer, Ltd.

(57) ABSTRACT

The purpose of the present invention is to provide a storage state in which a reactive compound layer can be stably maintained in a polymer film having a reactive compound layer on the surface. The film roll is obtained by winding together: a first polymer film having a reactive compound layer on the surface, and a second polymer film having a surface roughness (Ra) of 0.1 μm or more and a modulus of elasticity of 300 MPa or more and 10 GPa or less. The film bundle is obtained by laminating the first and second polymer films. Preferably, storing the film roll and the film bundle at a low temperature enables a thin layer of a reactive compound to be stably maintained.

20 Claims, 2 Drawing Sheets

(52) U.S. Cl.
CPC ... *B32B 2307/538* (2013.01); *C09J 2423/005* (2013.01); *C09J 2463/00* (2013.01); *C09J 2467/005* (2013.01); *C09J 2467/006* (2013.01); *C09J 2479/086* (2013.01); *C09J 2483/00* (2013.01)

(58) Field of Classification Search
CPC .. C09J 7/403; C09J 2423/005; C09J 2463/00; C09J 2467/005; C09J 2467/006; C09J 2479/086; C09J 2483/00; B32B 7/06; B32B 2307/538; B32B 2255/10; B32B 2255/26; B32B 2264/00; B32B 2264/10; B32B 2307/544; B32B 2307/546; B32B 2307/732; B32B 27/08; B32B 27/30; B32B 27/304; B32B 27/32; B32B 27/36; C08J 7/04

See application file for complete search history.

(56) References Cited

FOREIGN PATENT DOCUMENTS

| | | |
|---|---|---|
| JP | 2008-018628 A | 1/2008 |
| JP | 2015-178237 A | 10/2015 |
| JP | 2016-004120 A | 1/2016 |
| WO | WO 2009/014162 A1 | 1/2009 |

OTHER PUBLICATIONS

Korean Intellectual Property Office, Notification of Reason for Refusal in Korean Patent Application No. 10-2020-7003464 (dated Aug. 25, 2021).
China National Intellectual Property Administration, The First Office Action in Chinese Patent Application No. 201880047955.9 (dated Sep. 2, 2020).
China National Intellectual Property Administration, The Second Office Action in Chinese Patent Application No. 201880047955.9 (dated Apr. 6, 2021).
Japanese Patent Office, International Search Report in International Patent Application No. PCT/JP2018/026478 (dated Aug. 14, 2018).
Japan Patent Office, Notice of Reasons for Refusal in Japanese Patent Application No. 2019-531008 (dated Mar. 29, 2022).
China National Intellectual Property Administration, Decision of Rejection in Chinese Patent Application No. 201880047955.9 (dated Jan. 30, 2022).
European Patent Office, Extended European Search Report in European Patent Application No. 21202950.8 (dated Feb. 17, 2022).

* cited by examiner

FILM ROLL AND FILM BUNDLE

CROSS-REFERENCE TO RELATED APPLICATIONS

This patent application is the U.S. national phase of International Patent Application No. PCT/JP2018/026478, filed Jul. 13, 2018, which claims the benefit of Japanese Patent Application No. 2017-140914, filed Jul. 20, 2017, which are incorporated by reference in their entireties herein.

TECHNICAL FIELD

The present invention relates to a roll in which a first film having a reactive compound layer on a surface and a second film for protecting the face of the reactive compound layer are co-wound and/or a film bundle in which the first film and the second film are alternately stacked.

BACKGROUND ART

Silane coupling agents are widely used at the interface of an inorganic material such as glass and a polymer resin to improve the wettability and adhesiveness of both faces. Since a silane coupling agent is highly reactive, when the film coated with the silane coupling agent is stored as a roll, the reaction proceeds and it is often impossible to unwind the roll.

Patent Document 1 discloses a technique for applying a silane coupling agent in a gas phase state to a substrate. It is said that an extremely thin silane coupling agent layer can be realized with low defects with this technique. Even in a film having a low-defect silane coupling agent coating layer obtained by such a technique, when the film is wound into a roll, or the sheets of the film are stacked, it is difficult to maintain the satisfactory face of the silane coupling agent due to adhesion of foreign matters on the silane coupling agent layer or migration of the silane coupling agent layer to the surface of the counterpart, when the faces coated with the silane coupling agent are brought into contact with each other or when the face coated with the silane coupling agent and a protective film face are brought into contact with each other.

This problem is not limited in the case where a silane coupling agent is used, but is a problem generally relating to films coated with a reactive compound layer, in particular, a reactive compound that is liquid at room temperature.

PRIOR ART DOCUMENT

Patent Document

Patent Document 1: JP-A-2015-178237

SUMMARY OF THE INVENTION

Problems to be Solved by the Invention

As a result of diligent studies to solve the above problems, the inventors of the present invention found that by storing the film in the state that the face coated with the reactive compound of the film is in contact with a film having a surface roughness (Ra) of a certain value or more, contact between the face that is coated with the reactive compound and the face that is not coated with the reactive compound can be suppressed, and unwinding can be easily performed, and found that the present technique is widely applicable to general liquid-coated films, and accomplished the present invention.

Solutions to the Problems

That is, the present invention has the following configurations.

[1] A film roll comprises
a first polymer film having a reactive compound layer on at least one surface; and
a second polymer film having a rough surface with a surface roughness Ra of 0.1 µm or more and 5 µm or less on at least one side, the second polymer film having a modulus of elasticity of 300 MPa or more and 10 GPa or less,
the first polymer film and the second polymer film being co-wound in a state that the surface having the reactive compound layer of the first polymer film and the rough surface of the second film face each other.

[2] The film roll according to [1], wherein the second polymer film contains, as a lubricant, inorganic particles having a volume average particle diameter of 0.1 µm or more and 10 µm or less in an amount ranging from 0.3% by mass or more to 5% by mass.

[3] The film roll according to [1] or [2], wherein a peeling strength between the first polymer film and the second polymer film is 0.5 N/cm or less after the surface having the reactive compound layer of the first polymer film and the rough surface of the second film are stacked to face each other, and held at −15° C. for 24 hours under a load of 8 kg/square meters.

[4] The film roll according to any one of [1] to [3], wherein a reactive compound forming the reactive compound layer is a silane coupling agent.

[5] The film roll according to any one of [1] to [4], wherein the reactive compound layer has a thickness of 5 nm or more and 800 nm or less.

[6] A film bundle comprises
a first polymer film having a reactive compound layer on at least one surface; and
a second polymer film having a rough surface with a surface roughness Ra of 0.1 µm or more and 5 µm or less on at least one side, the second polymer film having a modulus of elasticity of 300 MPa or more and 10 GPa or less,
the first polymer film and the second polymer film being alternately stacked in a state that the surface having the reactive compound layer of the first polymer film and the rough surface of the second film face each other.

The present invention preferably further has the following configuration.

[7] A method for storing a film roll having a reactive compound layer comprises storing the film roll according to any one of [1] to [5] at −5° C. or lower.

[8] A method for storing a film bundle having a reactive compound layer comprises storing the film bundle according to [6] at −5° C. or lower.

[9] The film roll according to any one of [1] to [5] or the film bundle according to [6], wherein a reactive compound forming the reactive compound layer has a softening point of 70° C. or lower measured by a ring and ball method.

[10] The film roll according to any one of [1] to [5] or the film bundle according to [6], wherein a reactive compound forming the reactive compound layer a liquid at least at 25° C. under normal pressure.

Effects of the Invention

In the film roll of the present invention, since the film having a surface roughness of a certain value or more can prevent contact between the face coated with the reactive compound and the other surface, it is possible to prevent the difficulty in unwinding due to close adhesion of films, and prevent migration and transferring of a part or the whole of the reactive compound layer to the facing film face.

Therefore, even in a film coated with a highly reactive compound such as a silane coupling agent, it is possible to wind the film as a roll, and it is possible to hold as a film bundle in which sheet-like films are stacked, and hence it is possible to maintain a high-quality reactive compound face.

In the present invention, by storing a continuous film coated with a reactive compound as such a film roll, the film roll can be easily can be easily unwound without transferring or reaction of the reactive compound.

MODE FOR CARRYING OUT THE INVENTION

Figure 1:
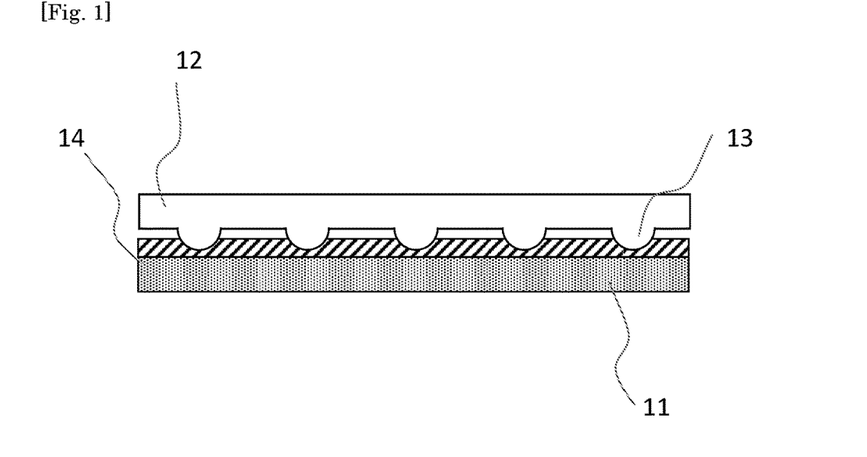
FIG. 1 is a schematic view showing a cross section of a film unwound from a film roll or a film bundle of the present invention.

Hereinafter, the film roll or film bundle of the present invention will be described with reference to the drawings. FIG. 1 is a schematic view showing a cross section of a film unwound from the film roll or a film bundle of the present invention.

A first polymer film 11 coated with a reactive compound 14 is co-wound or stacked with a second polymer film 12. The face being in contact with the first polymer film of the second polymer film 12 has a predetermined surface roughness (Ra) by a technique such as addition of a lubricant, and surface contact with the reactive compound layer of the first polymer film can be avoided due to the protrusions in microscopic views. Therefore, it is possible to prevent such trouble that the reactive compound layer of the first polymer film and the second polymer film are adhered to each other, making it difficult to delaminate the films (unwinding is difficult), or the reactive compound layer is impaired due to transferring to the face of the counterpart.

Examples of the polymer film that can be used in the present invention include films of polyester such as PET, PEN or PBT, polyamide film, polyimide film, polyimide benzothiazole film, polyimide benzoxazole film, polyimide benzimidazole film, polybenzoxazole film, polyethersulfone film, polyamideimide film, polyethylene film, polypropylene film, polyvinyl chloride film, and polyvinylidene chloride film.

In the present invention, a sheet-like continuous polymer film having an area of 0.1 square meters or more can be used. In the present invention, a continuous polymer film in the form of a continuous film having a width of 240 mm or more and a length of 10 m or more can be used. The use of a large-area substrate is advantageous in terms of productivity. On the other hand, if the area is large, defects are likely to occur stochastically and the yield of the product is difficult to increase. However, in the treatment method of the present invention, since the frequency of occurrence of defects is very low, a large-area substrate can be used effectively. These can be used for both the first polymer film and the second polymer film.

In the present invention, as a very special case of a polymer film, it can be applied to a long flexible glass. Here, the flexible glass is a thin glass having a thickness of 5 μm or more and 200 μm or less. It is a glass that is flexible like a polymer film and can be wound into a roll. The flexible glass may be a flexible glass in which a polymer film is bonded on either face for ensuring the handleability and the safety such as prevention of scattering in case of breakage.

Examples of the reactive compound that forms the reactive compound layer in the present invention include a compound having an unsaturated double bond, a compound having an epoxy group, a compound having an amino group, a compound having a carboxyl group, a compound having a hydroxyl group, an isocyanate compound, and a compound having a silanol group. The present invention is suitably applicable to a reactive compound that is liquid preferably at 25° C.

As the reactive compound suitably used in the present invention, a silane coupling agent can be used. The silane coupling agent can be used alone or in combination of two or more. Further, the silane coupling agent can be used as a solution in alcohol, water or various solvents.

Examples of the silane coupling agent that can be used in the present invention include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, vinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-phenyl-3-aminopropyltrimethoxysilane, N-(vinylbenzyl)-2-aminoethyl-3-aminopropyltrimethoxysilane hydrochloride, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatepropyltriethoxysilane, tris-(3-trimethoxysilylpropyl) isocyanurate, chloromethylphenethyltrimethoxysilane, chloromethyltrimethoxysilane, aminophenyltrimethoxysilane, aminophenethyltrimethoxysilane, aminophenylaminomethylphenethyltrimethoxysilane, and hexamethyldisilazane.

Examples of the silane coupling agent that can be used in the present invention further include, in addition to the above, n-propyltrimethoxysilane, butyltrichlorosilane, 2-cyanoethyltriethoxysilane, cyclohexyltrichlorosilane, decyltrichlorosilane, diacetoxydimethylsilane, diethoxydimethylsilane, dimethoxydimethylsilane, dimethoxydiphenylsilane, dimethoxymethylphenylsilane, dodecyltrichlorosilane, dodecyltrimethoxysilane, ethyltrichlorosilane, hexyltrimethoxysilane, octadecyltriethoxysilane, octadecyltrimethoxysilane, n-octyltrichlorosilane, n-octyltriethoxysilane, n-octyltrimethoxysilane, triethoxyethylsilane, triethoxymethylsilane, trimethoxymethylsilane, trimethoxyphenylsilane, pentyltriethoxysilane, pentyltrichlorosilane, triacetoxymethylsilane, trichlorohexylsilane, trichloromethylsilane, trichlorooctadecylsilane, trichloropropylsilane, trichlorotetradecylsilane, trimethoxypropylsilane, allyltrichlorosilane, allyltriethoxysilane, allyltrimethoxysilane, diethoxymethylvinylsilane, dimethoxymethylvinylsilane, trichlorovinylsilane, triethoxyvinylsilane, vinyltris(2-methoxyethoxy)silane, trichloro-2-cyanoethylsilane, diethoxy(3-glycidyloxypropyl)methylsilane, 3-glycidyloxypropyl(dimethoxy)methylsilane, and 3-glycidyloxypropyltrimethoxysilane.

Further, other alkoxysilanes such as tetramethoxysilane or tetraethoxysilane may be appropriately added to the silane coupling agent. The silane coupling agent may be used after the reaction is advanced to some extent by additionally performing a mixing and heating operations regardless of whether other alkoxysilanes such as tetramethoxysilane or tetraethoxysilane is appropriately added to the silane coupling agent.

Among such silane coupling agents, the silane coupling agent suitably used in the present invention is preferably a silane coupling agent having a chemical structure having one silicon atom in one molecule of the coupling agent.

In the present invention, particularly preferred silane coupling agents include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, aminophenyltrimethoxysilane, aminophenethyltrimethoxysilane, and aminophenylaminomethylphenethyltrimethoxysilane. When the process requires particularly high heat resistance, it is desirable to use the one in which Si and the amino group are connected with an aromatic group.

In the present invention, if necessary, a phosphorus coupling agent, a titanate coupling agent, or the like may be used in combination.

In the present invention, when the silane coupling agent is used in combination with a solvent, the solvent is preferably at least one or more liquid selected from water, monohydric alcohols having 8 or less carbon atoms, and dihydric alcohols having 4 or less carbon atoms. More preferably, the solvent is preferably one or more solvents selected from methanol, ethanol, normal propanol, isopropanol, butanol, ethylene glycol, propylene glycol, and water. In the present invention, a mixed solvent composed of two or more solvents can be used. In the present invention, it is preferred to use a mixed solvent of water and alcohol, a mixed solvent of water and ethylene glycol or propylene glycol, further a mixed solvent of water, an alcohol having 3 or less carbon atoms, and a diol having 3 or less carbon atoms.

In the present invention, a continuous first polymer film is passed through a reactive compound coating apparatus, and after being led out from the apparatus, the solvent and the like are removed by a drying step or the like, and the resultant first polymer film may be co-wound with a second polymer film having a predetermined surface to give a film roll. Before making a film roll, the first and second polymer films in a stacked state may be cut to give a film bundle. Alternatively, the films may be wound into a roll, unwound in a separate step, and cut into a film bundle.

In the present invention, it is preferred that the drying is performed so that the water content of the first polymer film and the second polymer film is preferably 0.3% by mass or less, more preferably 0.15% by mass or less, still more preferably 0.08% by mass or less. If moisture remains in the polymer films more than necessary, blister defects are likely to occur. Control of the water content is particularly important when an aramid film, polyimide film, or polyamideimide film is used as the first polymer film.

In the present invention, it is preferred to introduce the first polymer film into the liquid coating mechanism of the present invention after dry cleaning the first polymer film with an atmospheric pressure plasma processing apparatus. In the present invention, it is preferred to apply the reactive compound after dry-cleaning the first polymer film with a UV ozone irradiation apparatus. Here, the UV ozone treatment apparatus is a treatment apparatus that irradiates the substrate with ultraviolet rays having a wavelength of 300 nm or less in the atmosphere and simultaneously exposes the substrate to ozone generated in the vicinity of the UV light source.

The storage environment of the film roll or film bundle of the present invention is preferably 15° C. or lower, more preferably 5° C. or lower, still more preferably −5° C. or lower, further preferably −15° C. or lower.

EXAMPLES

Hereinafter, the present invention will be described more specifically with reference to examples. However, the present invention is not limited by the following examples. The methods for evaluating physical properties in the following examples are as follows.

<Surface Roughness>

The surface roughness (Ra) of the film in contact with the film surface coated with the reactive compound was evaluated using a scanning laser microscope (VK-8500). The film was fixed on the observation stage, and the surface roughness in a 20 μm square area was calculated. Absolute values of deviations from the average line to the measurement curve in the portion of the reference length (20 μm) in the direction of the average line from the measured roughness curve were summed, and the average value was defined as Ra.

<Modulus of Elasticity>

Using a universal testing machine (available from Shimadzu Corporation, "Precision Universal Testing Machine AG-IS"), the strain-stress curve was measured at an atmospheric temperature of 23° C. and a relative humidity of 60% under the conditions of a sample length of 100 mm (length between chucks) and an elongation rate of 50 mm/min. The modulus of elasticity was calculated from the tangent that gives the maximum gradient near the origin of the curve. For the modulus of elasticity, the mean value of 10 measurements was used.

<Adhesiveness>

Predetermined faces of a polyimide film with the silane coupling agent (first polymer film) and a second polymer film cut into 15 cm×15 cm were overlapped with each other, and the films were stored at a temperature of −15° C. under a load of 8 kg/square meters. At this time, the films were arranged so that the polyimide film was placed on the lower side, and the polyimide film was fixed on a metal plate with a double-sided tape of 20 cm×20 cm. After storing the films at low temperature for 5 days, the two stacked films were cut together to have 10 square cuts reaching the polyimide film by using a cutter guide with a gap spacing of 2 mm. The metal plate to which the polyimide film was fixed was turned over, and the number of squares of the co-winding film peeled off from the polyimide film was visually counted to determine the adhesiveness. The square in which the film was partially peeled off was counted as a non-peeled square, and was ranked according to the following criteria.

○: 90 to 100 peeled squares

■: 0 to 89 peeled squares

Comparative Example 1

Figure 2:
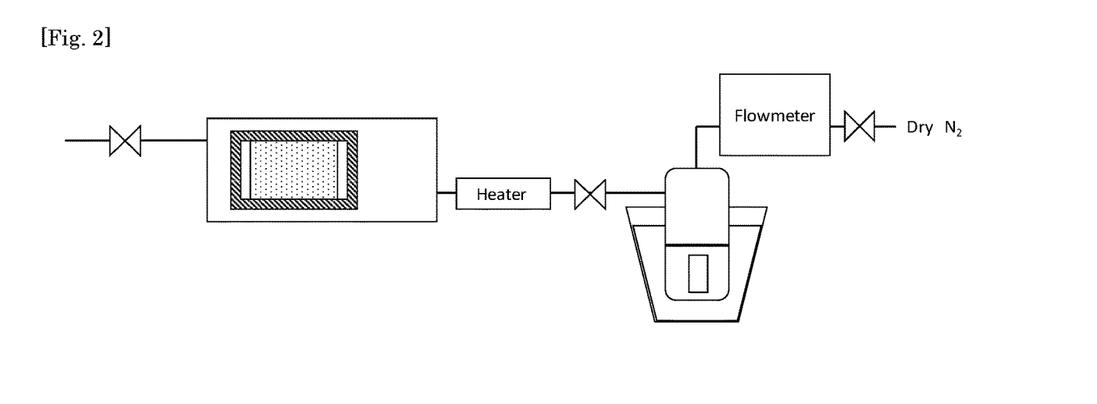
FIG. 2 is a schematic view showing an example of a reactive compound coating apparatus of the present invention.

A silane coupling agent was applied to a polyimide film under the following conditions using an apparatus for generating a silane coupling agent vapor as schematically shown in FIG. 2 (batch type vapor phase method).

The polyimide film was held on a stainless frame having an opening of 370 mm×470 mm, and held vertically in a chamber into which the silane coupling agent vapor was introduced.

A container containing 100 g of a silane coupling agent ("KBM-903": 3-aminopropyltrimethoxysilane, available from Shin-Etsu Chemical Co., Ltd.) was regulated to a temperature of 40° C., and then fed with nitrogen gas at 25 L/min in a bubbling manner, and the generated nitrogen gas containing the silane coupling agent vapor was introduced into the chamber through piping, and both sides of the polyimide film used as the first polymer film were exposed to the gas for 3 minutes.

Note that 3-aminopropyltrimethoxysilane has a melting point of −60° C. or lower and a boiling point of 91 to 92° C., and is liquid at least at 25° C. to 40° C. under normal pressure.

The obtained polyimide film with the silane coupling agent was cut into a size of 15 cm×15 cm, and overlaid as a second polymer film on the smooth surface of a polyethylene terephthalate film ("A4100" available from Toyobo Co., Ltd.), and the adhesiveness was evaluated.

Comparative Example 2

The evaluation was carried out in the same manner as in Comparative Example 1 except that the polyethylene terephthalate film was changed to Polywrap (polyethylene film available from Ube Film Co., Ltd.).

Example 1

The evaluation was carried out in the same manner as in Comparative Example 1 except that the polyethylene terephthalate film was changed to a polytetrafluoroethylene sheet (available from Nitto Denko Corporation).

Example 2

The evaluation was carried out in the same manner as in Comparative Example 1 except that the polyethylene terephthalate film was changed to a polypropylene film ("P1128A" available from Toyobo Co., Ltd.).

Example 3

The evaluation was carried out in the same manner as in Comparative Example 1 except that the polyethylene terephthalate film was changed to a polyethylene terephthalate film ("E5100" available from Toyobo Co., Ltd.).

Example 4

Figure 3:
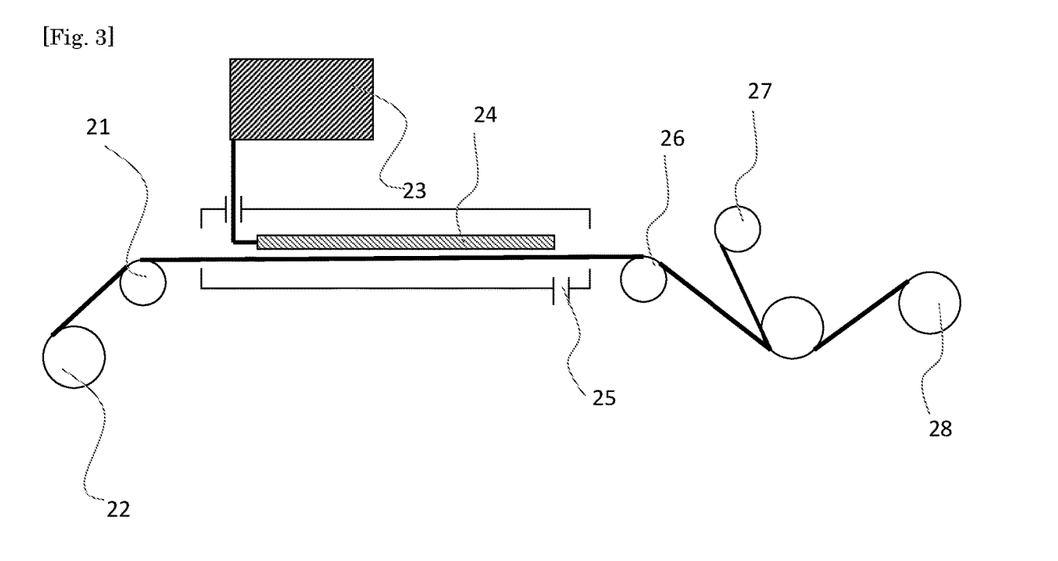
FIG. 3 is a schematic view showing an example of a mechanism for co-winding the first polymer film of the present invention having passed through the reactive compound coating apparatus, with the second polymer film.

Using the apparatus for applying a silane coupling agent vapor as schematically shown in FIG. 3, a continuous polyimide film with a width of 100 mm was set to pass through a chamber of 750 mm×20 mm×10 mm having a slit of 20 mm×160 mm at a speed of 240 mm/min.

A container containing 50 g of a silane coupling agent ("KBM-903": 3-aminopropyltrimethoxysilane, available from Shin-Etsu Chemical Co., Ltd.) was regulated to a temperature of 40° C., and fed with nitrogen gas at 4.6 L/min in a bubbling manner, and the generated nitrogen gas containing the silane coupling agent vapor was introduced into the chamber through piping, and both sides of the polyimide film were exposed to the gas to give a polyimide film coated with the silane coupling agent. Then the polyimide film coated with the silane coupling agent was co-wound with a polyethylene terephthalate film E5100 (available from Toyobo Co., Ltd.) having a thickness of 50 μm to give a film roll. From the obtained film roll, a stack of the first polymer film and the second polymer film in a size of 15 cm×15 cm was cut out, and the adhesiveness was evaluated.

After storing the obtained film roll at −15° C. for 5 days, a stack of the first polymer film and the second polymer film in a size of 15 cm×15 cm was cut out, and the adhesiveness was evaluated in the same manner.

Example 5

Using a spray coater, a silane coupling agent was applied to a polyimide film serving as a first polymer film under the following conditions.

A 0.5 wt % silane coupling agent solution in isopropanol was applied by spraying to the polyimide film having a width of 280 mm and moving at 10 m/min, and the film was pre-dried at 25° C. and then dried at 60° C., to give a polyimide film coated with the silane coupling agent. Next, as a second polymer film, a polyethylene terephthalate film ("E5100" available from Toyobo Co., Ltd.) was overlaid and co-wound to obtain a film roll. From the obtained film roll, a stack of the first polymer film and the second polymer film in a size of 15 cm×15 cm was cut out, and the adhesiveness was evaluated.

After storing the obtained film roll at −15° C. for 5 days, a stack of the first polymer film and the second polymer film in a size of 15 cm×15 cm was cut out, and the adhesiveness was evaluated in the same manner.

Example 6

Using a comma coater, an epoxy resin was applied to a polyethylene terephthalate film (E5100 available from Toyobo Co., Ltd.) serving as a first polymer film under the following conditions.

Epoxy resin JER1001B80 (MEK solution) available from Mitsubishi Chemical Corporation was applied to a polyethylene terephthalate film having a width of 520 mm and moving at 3 m/min with a comma coater, and the film was pre-dried at 25° C. and then dried at 60° C., to give a polyethylene terephthalate film coated with the epoxy resin. Next, as a second polymer film, a polypropylene film ("P1128A" available from Toyobo Co., Ltd.) was overlaid and co-wound to obtain a film roll. From the obtained film roll, a stack of the first polymer film and the second polymer film in a size of 15 cm×15 cm was cut out, and the adhesiveness was evaluated.

Epoxy resin JER1001 is a bisphenol type epoxy resin, and has a softening temperature in the ring and ball method of 64° C. JER1001B80 is a solution of JER1001 in methyl ethyl ketone (MEK) prepared to have a solid content concentration of about 80%.

After storing the obtained film roll at −15° C. for 5 days, a stack of the first polymer film and the second polymer film in a size of 15 cm×15 cm was cut out, and the adhesiveness was evaluated in the same manner.

Example 7

A film roll was obtained in the same manner as in Example 6 except that the epoxy resin was changed to pentaerythritol tetraacrylate (PE4A) (available from Kyoeisha Chemical), which is a multifunctional acrylate. Then evaluation was carried out in the same manner.

Table 1 shows the results obtained in the above comparative examples and examples.

Pentaerythritol tetraacrylate has a melting point of 18° C. and is liquid at 25° C. under normal pressure.

TABLE 1

|  | Comparative Example 1 | Comparative Example 2 | Example 1 | Example 2 | Example 3 | Example 4 | Example 5 | Example 6 | Example 7 |
|---|---|---|---|---|---|---|---|---|---|
| First Polymer film | Polymide 25 μmt | Polymide 10 μmt | Polymide 25 μmt | Polymide 25 μmt | Polymide 38 μmt | Polymide 38 μmt | Polymide 38 μmt | PET 50 μmt | PET 50 μmt |
| Reactive compound | KBM-903 | KBM-903 | KBM-903 | KBM-903 | KBM-903 | KBM-903 | KBM-903 | 1001B80 | PE4A |
| Coating method of reactive compound | Batch type gas phase | Batch type gas phase | Batch type gas phase | Batch type gas phase | Batch type gas phase | RtoR gas phase coating | RtoR spray coating | RtoR comma coating | RtoR comma coating |
| Second polymer film Type | A4100 (smooth surface) | PE (Wrap) | PTFE | PP | E5100 | E5100 | E5100 | PP | PP |
| Surface roughness Ra [μm] | 0.005 | 0.05 | 0.38 | 0.18 | 0.16 | 0.16 | 0.16 | 0.18 | 0.18 |
| Elasticity [MPa] | 4000 | 250 | 400 | 630 | 3920 | 3920 | 3920 | 630 | 630 |
| Adhesion (sheet-like storage) | × | × | ◯ | ◯ | ◯ | ◯ | ◯ | ◯ | ◯ |
| Adhesion (roll-like storage) | — | — | — | — | — | ◯ | ◯ | ◯ | ◯ |

INDUSTRIAL APPLICABILITY

As described above, the film roll and film bundle of the present invention can stably maintain a reactive compound layer despite having a layer made of a reactive compound on the surface. In the present invention, as exemplified in the examples, it is possible to maintain various reactive compounds such as an epoxy resin which is a thermosetting compound, a (meth)acrylate which is a photocurable compound, and a silane coupling agent for a long time in a state of a thin film layer, and thus the present invention can be used effectively in various industrial fields.

DESCRIPTION OF REFERENCE SIGNS

11 First polymer film
12 Second polymer film
13 Lubricant
14 Reactive compound
21 Height adjustment roll
22 First polymer film unwinding part
23 Reactive compound supply part
24 Reactive compound discharge part
25 Air outlet for reactive compound and solvent vapor
26 Height adjustment roll
27 Second polymer film supply roll
28 Film winding part

The invention claimed is:

1. A film roll comprising:
a first polymer film having a reactive compound layer on at least one surface and
a second polymer film having a rough surface with a surface roughness Ra of 0.1 μm or more and 5 μm or less on at least one side, the second polymer film having a modulus of elasticity of 300 MPa or more and 10 GPa or less,
wherein
the first polymer film and the second polymer film are co-wound in a state that the surface having the reactive compound layer of the first polymer film and the rough surface of the second film contact each other, and
a reactive compound forming the reactive compound layer is a silane coupling agent, an epoxy resin, a multifunctional acrylate, or a combination thereof.

2. The film roll according to claim 1, wherein the second polymer film contains, as a lubricant, inorganic particles having a volume average particle diameter of 0.1 μm or more and 10 μm or less in an amount ranging from 0.3% by mass or more to 5% by mass.

3. The film roll according to claim 2, wherein the reactive compound layer has a thickness of 5 nm or more and 800 nm or less.

4. The film roll according to claim 2, wherein the reactive compound forming the reactive compound layer is the silane coupling agent.

5. The film roll according to claim 2, wherein a peeling strength between the first polymer film and the second polymer film is 0.5 N/cm or less after the surface having the reactive compound layer of the first polymer film and the rough surface of the second film are stacked to contact each other, and held at −15° C. for 24 hours under a load of 8 kg/square meters.

6. The film roll according to claim 5, wherein the reactive compound layer has a thickness of 5 nm or more and 800 nm or less.

7. The film roll according to claim 5, wherein the reactive compound forming the reactive compound layer is the silane coupling agent.

8. The film roll according to claim 7, wherein the reactive compound layer has a thickness of 5 nm or more and 800 nm or less.

9. The film roll according to claim 1, wherein a peeling strength between the first polymer film and the second polymer film is 0.5 N/cm or less after the surface having the reactive compound layer of the first polymer film and the rough surface of the second film are stacked to contact each other, and held at −15° C. for 24 hours under a load of 8 kg/square meters.

10. The film roll according to claim 9, wherein the reactive compound forming the reactive compound layer is the silane coupling agent.

11. The film roll according to claim 10, wherein the reactive compound layer has a thickness of 5 nm or more and 800 nm or less.

12. The film roll according to claim 9, wherein the reactive compound layer has a thickness of 5 nm or more and 800 nm or less.

13. The film roll according to claim 1, wherein the reactive compound forming the reactive compound layer is the silane coupling agent.

14. The film roll according to claim 13, wherein the reactive compound layer has a thickness of 5 nm or more and 800 nm or less.

15. The film roll according to claim 1, wherein the reactive compound layer has a thickness of 5 nm or more and 800 nm or less.

16. The film roll according to claim 1, wherein the rough surface has protrusions, and the surface having the reactive compound layer and the protrusions contact each other.

17. The film roll according to claim 1, wherein the reactive compound forming the reactive compound layer is a silane coupling agent selected from N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, vinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-phenyl-3-aminopropyltrimethoxysilane, N-(vinylbenzyl)-2-aminoethyl-3-aminopropyltrimethoxysilane hydrochloride, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatepropyltriethoxysilane, tris-(3-trimethoxysilylpropyl) isocyanurate, chloromethylphenethyltrimethoxysilane, chloromethyltrimethoxysilane, aminophenyltrimethoxysilane, aminophenethyltrimethoxysilane, aminophenylaminomethylphenethyltrimethoxysilane, hexamethyldisilazane, n-propyltrimethoxysilane, butyltrichlorosilane, 2-cyanoethyltriethoxysilane, cyclohexyltrichlorosilane, decyltrichlorosilane, diacetoxydimethylsilane, diethoxydimethylsilane, dimethoxydimethylsilane, dimethoxydiphenylsilane, dimethoxymethylphenylsilane, dodecyltrichlorosilane, dodecyltrimethoxysilane, ethyltrichlorosilane, hexyltrimethoxysilane, octadecyltriethoxysilane, octadecyltrimethoxysilane, n-octyltrichlorosilane, n-octyltriethoxysilane, n-octyltrimethoxysilane, triethoxyethylsilane, triethoxymethylsilane, trimethoxymethylsilane, trimethoxyphenylsilane, pentyltriethoxysilane, pentyltrichlorosilane, triacetoxymethylsilane, trichlorohexylsilane, trichloromethylsilane, trichlorooctadecylsilane, trichloropropylsilane, trichlorotetradecylsilane, trimethoxypropylsilane, allyltrichlorosilane, allyltriethoxysilane, allyltrimethoxysilane, diethoxymethylvinylsilane, dimethoxymethylvinylsilane, trichlorovinylsilane, triethoxyvinylsilane, vinyltris(2-methoxyethoxy)silane, trichloro-2-cyanoethylsilane, diethoxy(3-glycidyloxypropyl)methylsilane, 3-glycidyloxypropyl(dimethoxy)methylsilane, 3-glycidyloxypropyltrimethoxysilane, tetramethoxysilane, tetraethoxysilane, and a combination thereof.

18. A film bundle comprising:
a first polymer film having a reactive compound layer on at least one surface and
a second polymer film having a rough surface with a surface roughness Ra of 0.1 μm or more and 5 μm or less on at least one side, the second polymer film having a modulus of elasticity of 300 MPa or more and 10 GPa or less,
wherein
the first polymer film and the second polymer film are alternately stacked in a state that the surface having the reactive compound layer of the first polymer film and the rough surface of the second film contact each other, and
a reactive compound forming the reactive compound layer is a silane coupling agent, an epoxy resin, a multifunctional acrylate, or a combination thereof.

19. The film bundle according to claim 18, wherein the rough surface has protrusions, and the surface having the reactive compound layer and the protrusions contact each other.

20. The film bundle according to claim 18, wherein the reactive compound forming the reactive compound layer is a silane coupling agent selected from N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, vinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-phenyl-3-aminopropyltrimethoxysilane, N-(vinylbenzyl)-2-aminoethyl-3-aminopropyltrimethoxysilane hydrochloride, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatepropyltriethoxysilane, tris-(3-trimethoxysilylpropyl) isocyanurate, chloromethylphenethyltrimethoxysilane, chloromethyltrimethoxysilane, aminophenyltrimethoxysilane, aminophenethyltrimethoxysilane, aminophenylaminomethylphenethyltrimethoxysilane, hexamethyldisilazane, n-propyltrimethoxysilane, butyltrichlorosilane, 2-cyanoethyltriethoxysilane, cyclohexyltrichlorosilane, decyltrichlorosilane, diacetoxydimethylsilane, diethoxydimethylsilane, dimethoxydimethylsilane, dimethoxydiphenylsilane, dimethoxymethylphenylsilane, dodecyltrichlorosilane, dodecyltrimethoxysilane, ethyltrichlorosilane, hexyltrimethoxysilane, octadecyltriethoxysilane, octadecyltrimethoxysilane, n-octyltrichlorosilane, n-octyltriethoxysilane, n-octyltrimethoxysilane, triethoxyethylsilane, triethoxymethylsilane, trimethoxymethylsilane, trimethoxyphenylsilane, pentyltriethoxysilane, pentyltrichlorosilane, triacetoxymethylsilane, trichlorohexylsilane, trichloromethylsilane, trichlorooctadecylsilane, trichloropropylsilane, trichlorotetradecylsilane, trimethoxypropylsilane, allyltrichlorosilane, allyltriethoxysilane, allyltrimethoxysilane, diethoxymethylvinylsilane, dimethoxymethylvinylsilane, trichlorovinylsilane, triethoxyvinylsilane, vinyltris(2-methoxyethoxy)silane, trichloro-2-cyanoethylsilane, diethoxy(3-glycidyloxypropyl)methylsilane, 3-glycidyloxypropyl(dimethoxy)methylsilane, 3-glycidyloxypropyltrimethoxysilane, tetramethoxysilane, tetraethoxysilane, and a combination thereof.

* * * * *